(12) United States Patent
Chen

(10) Patent No.: US 7,675,697 B2
(45) Date of Patent: Mar. 9, 2010

(54) LENS MODULE AND METHOD FOR ASSEMBLING THE SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/124,873

(22) Filed: May 21, 2008

(65) Prior Publication Data
US 2009/0080094 A1    Mar. 26, 2009

(30) Foreign Application Priority Data
Sep. 21, 2007   (CN) ..................... 2007 1 0201806.7

(51) Int. Cl.
*G02B 7/02*    (2006.01)
(52) U.S. Cl. ........................ 359/819; 359/811; 359/822; 359/823
(58) Field of Classification Search .......... 359/811–824
See application file for complete search history.

(56) References Cited

U.S. PATENT DOCUMENTS

| 6,710,947 | B1 * | 3/2004 | Momot et al. ................ 359/819 |
| 7,221,524 | B2 * | 5/2007 | Ye et al. ...................... 359/819 |
| 2009/0002853 | A1 * | 1/2009 | Yuan ........................... 359/819 |

* cited by examiner

*Primary Examiner*—Mohammed Hasan
(74) *Attorney, Agent, or Firm*—Andrew C. Cheng

(57) ABSTRACT

An exemplary lens module includes a lens barrel, a barrel holder engaged with the lens barrel, a number of optical lenses received in the lens barrel; and a number of elastic spacers received in the lens barrel. Each of the elastic spacers is arranged between the adjacent optical lenses. Thus tilt of the optical lenses in the lens module will not occur, thereby improving quality of capturing images. The present invention also related to a method for assembling the lens module.

11 Claims, 1 Drawing Sheet

LENS MODULE AND METHOD FOR ASSEMBLING THE SAME

BACKGROUND

1. Technical Field

The present invention relates to lens modules, particularly to a lens module that is capable of preventing stress occurring on the optical components of the lens module, and a method for assembling the lens module.

2. Description of Related Art

Nowadays, camera modules are being combined with various portable electronic devices such as mobile phones, personal digital assistants (PDAs), and laptop computers to be increasingly multi-functional.

The lens module is a very important component of the camera module. Generally, the lens module includes a holder, a barrel, an image sensor, and a number of optical components such as optical lenses and filters received in the barrel. The barrel is partially received in the holder. The image sensor is generally held inside the holder, and disposed at a bottom of the holder or at the end of the barrel received in the holder. The optical components are coupled with the image sensor so as to capture images. A coaxial alignment of the optical axes of the optical components is the key factor for having a good image quality.

However, during using the lens module to capture images, the image sensor works and generates heat. The generated heat causes a temperature gradient distribution in the lens module, which further causes each of the optical components to generate different thermal stresses and an internal stress therein. Due to the thermal stress and the internal stress, the optical components tilts and moves. The optical axes of the optical components cannot maintain the coaxial alignment. Therefore, the lens module has a poor optical modulation function (MTF) and a poor image quality.

What is needed, therefore, is a lens module that is capable of preventing stress occurring on the optical components of the lens module. What is also needed, therefore, is a method for assembling the lens module.

SUMMARY

One present embodiment provides a lens module. The lens module includes includes a lens barrel, a barrel holder engaged with the lens barrel, a number of optical lenses received in the lens barrel; and a number of elastic spacers received in the lens barrel. Each of the elastic spacers is arranged between the adjacent optical lenses.

Another present embodiment provides a method for assembling a lens module. In the method, firstly, a number of optical lenses and a number of elastic spacers is disposed in a lens barrel in a manner that the optical lenses and the elastic spacers are arranged in an alternate fashion. Secondly, the lens barrel is engaged with the barrel holder.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments.

DETAILED DESCRIPTION OF THE EMBODIMENTS

Figure 1:
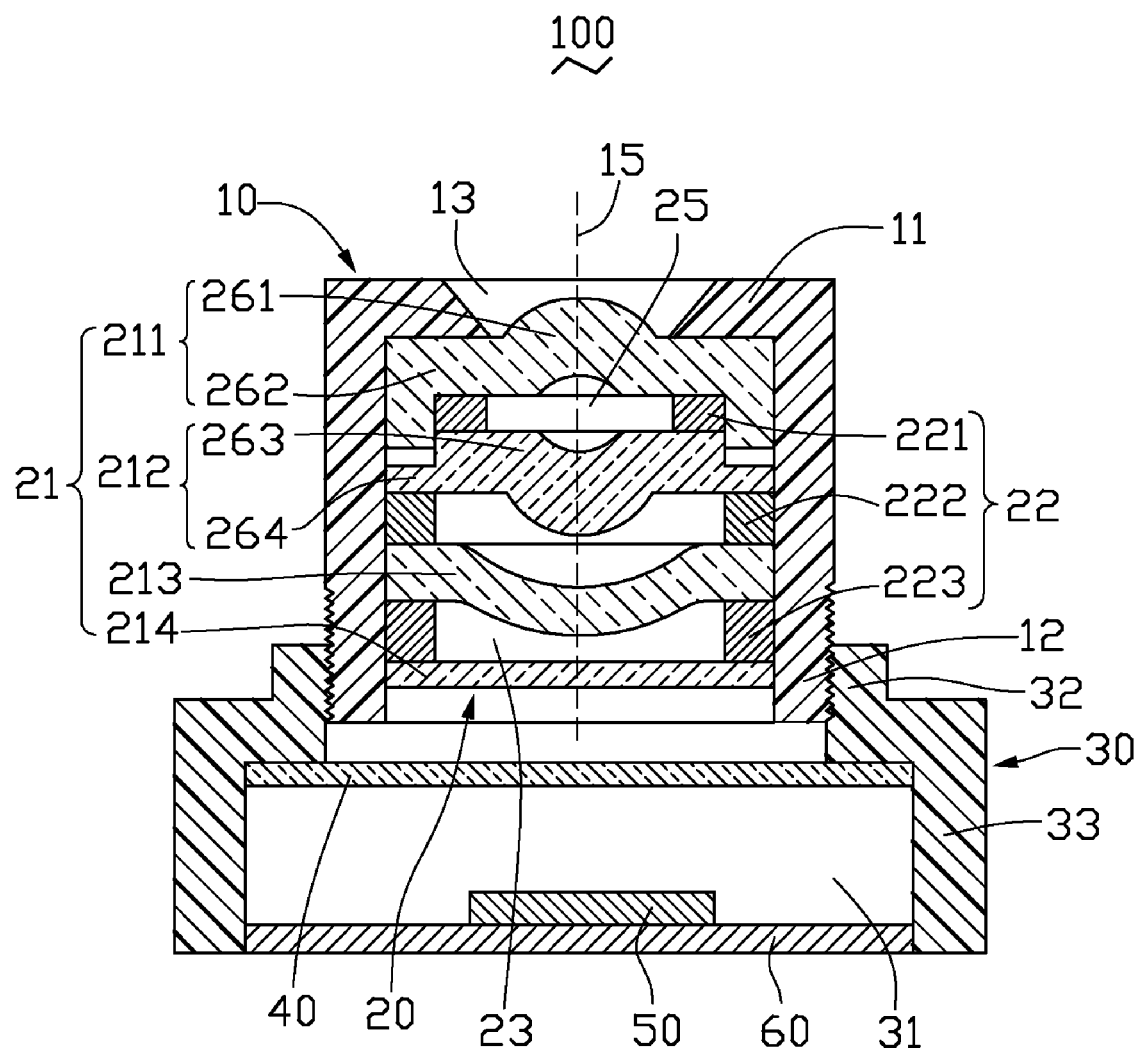
FIG. 1 is a schematic, cross-sectional view of the lens module according to a present embodiment.

Embodiment will now be described in detail below and with reference to the drawing.

Referring to FIG. 1, an exemplary lens module 100, according to a present embodiment, includes a lens barrel 10, an optical unit 20 and a barrel holder 30.

The lens barrel 10 is substantially in the form of a hollow cylinder and is received in the barrel holder 30. For example, the lens barrel 10 is partially received/screwed into the barrel holder 30. The lens barrel 10 is configured (i.e., structured and arranged) for receiving the optical unit 20 therein. The lens barrel 10 includes a first end 11 and an opposite second end 12. The first end 11 of the lens barrel 10 defines an aperture 13 therein. The aperture 13 is configured for receiving light beams through into the lens module 100. A central axis of the aperture 13 and a central axis of the lens barrel 10 are essentially coaxial. The second end 12 is partially received/screwed into the barrel holder 30.

The optical unit 20 includes a number of optical lenses 21 and a number of elastic spacers 22. In the present embodiment, referring to FIG. 1, the optical lenses 21 includes a first lens 211, a second lens 212, a third lens 213 and a filter 214. The first lens 211, the second lens 212 and the third lens 213 are usually made of glass or resin, and can be aspherical lenses or spherical lenses. The filter 214 is usually an infrared-cut filter or an ultraviolet-cut filter. The filter 214 is configured for allowing light in the visible spectrum passing therethrough while blocking light in the infrared/ultraviolet spectrum and is used to avoid interference from infrared/ultraviolet radiation. A central axis of first lens 211, a central axis of the second lens 212, a central axis of the third lens 213 and a central axis of the filter 214 are essentially coaxial, thereby defining an optical axis 15. The first lens 211, the second lens 212, the third lens 213 and the filter 214 are received in the lens barrel 10 in the order written from the first end 11 to the second end 12 of the lens barrel 10 along the optical axis 15. Cross-section of the first lens 211, the second lens 212, the third lens 213 and the filter 214 have a circular configuration. The outer diameter of each of the first lens 211, the second lens 212, the third lens 213 and the filter 214 is equal to an inner diameter of the lens barrel 10.

The elastic spacers 22 and the optical lenses 21 are alternately arranged and received in the lens barrel 10 along the optical axis 15. Each of the elastic spacers 22 is configured for separating the two adjacent optical lenses 21, thereby forming a space therebetween. Each of the elastic spacers 22 can be designed according to configurations of the two adjacent optical lenses 21. Each of the elastic spacers 22 has a through hole 23 configured for facilitating light beams passing through the lens module 100. A central axis of the through hole 23 and the optical axis 15 are essentially coaxial. Advantageously, a configuration of a cross-section of the through hole 23 is circular. Thus, each of the elastic spacers 22 is an essentially ring. Each of the elastic spacers 22 has a thickness in a range from 2 micrometers to 500 micrometers. Preferably, each of the elastic spacers 22 has a thickness in a range from 10 micrometers to 100 micrometers.

Due to elasticity of the elastic spacer 22, the elastic spacers 22 can absorb all sorts of stresses occurring on the optical lenses 21 such as internal stress and thermal stress, thereby preventing the optical lenses 21 from tilting and moving due to the stresses. Therefore, all the center axes of the optical lenses 21 can be essentially coaxial at all time so as to ensure good image quality of the lens module 100.

Advantageously, the elastic spacers 22 are comprised of a black elastic polymer material, thereby avoiding glare phenomena, flare phenomena and ghost image phenomena during capturing images. The black elastic polymer material can be a black rubber such as a polyurethane rubber, a chloride polyethylene rubber, chlorosulfonated polyethylene rubber, cis-1,4-polybutadiene rubber and natural rubber. The black elastic polymer material also can be a black elastic resin such as a polyurethane elastic resin, a polyvinyl chloride elastic resin and a polyolefin thermoplastic elastic resin. The elastic spacer 22 can be made by a pressing process.

In the present embodiment, the elastic spacers 22 includes a first elastic spacer 221, a second elastic spacer 222 and a third elastic spacer 223. The first elastic spacer 221 is disposed between the first lens 211 and the second lens 212 and is configured for separating the first lens 211 and the second lens 212, thereby forming a space therebetween. The second elastic spacer 222 is disposed between the second lens 212 and the third lens 213 and is configured for separating the second lens 212 and the third lens 213, thereby forming a space therebetween. The third elastic spacer 223 is disposed between the third lens 213 and the filter 214 and is configured for separating the third lens 213 and the filter 214, thereby forming a space therebetween.

In the present embodiment, the first lens 211 includes a first main portion 261 and a first peripheral portion 262. The first main portion 261 is in the center of the first lens 211 and is configured for allowing light beams passing therethrough. The first peripheral portion 262 surrounds the first main portion 261 and extends from a periphery of the first main portion 261, thereby defining a space 25 in the first lens 211. The second lens 212 includes a second main portion 263 and a second peripheral portion 264. The second main portion 263 is in the center of the second lens 212 and is configured for allowing light beams passing therethrough. The second peripheral portion 264 surrounds the second main portion 263 and extends from a periphery of the second main portion 263 along a direction perpendicularly to the optical axis 15. The second main portion 263 is engaged in the space 25 of the first lens 211, and thus the second lens 212 is coupled with the first lens 211. The first elastic spacer 221 is disposed in the space 25 of the first lens 211 and between the first main portion 261 and the second lens 212 so as to prevent the first main portion 261 from contacting with the second main portion 263. Therefore, an outer diameter of the first elastic spacer 221 is less than an outer diameter of the first lens 211. The outer diameter of the first lens 211 is less than the inner diameter of the lens barrel 10.

Additionally, in the present embodiment, the second elastic spacer 222 between the second lens 212 and the third lens 213 have an outer diameter that is equal to the inner diameter of the lens barrel 10. The third elastic spacer 223 between the third lens 213 and the filter 214 have an outer diameter equal to the inner diameter of the lens barrel 10. Therefore, the outer diameter of the first spacer 221 is less than the outer diameter of each of the second elastic spacer 222 and the third elastic spacer 223.

The barrel holder 30 defines a cavity 31 therein. The cavity 31 is configured for partially receiving the lens barrel 10 and other components therein. The barrel holder 30 includes a first end portion 32 and an opposite second end portion 33. The first end portion 32 of the barrel holder 30 is coupled with the second end 12 of the lens barrel 10 so that the barrel holder 30 engages with the lens barrel 110. For example, the second end 12 of the lens barrel 10 is partially received/screwed into the first end portion 32 of the barrel holder 30. The second end portion 33 of the barrel holder 30 may connect to other components.

In the present embodiment, a glass cover 40, an image sensor 50 and a ceramic circuit board 60 is received in the cavity 31 from the first end portion 32 to the second end portion 33 of the barrel holder 30, in the order written. The glass cover 40 is received in the cavity 31 and covers the second end 12 of the lens barrel 10. The image sensor 50 is mounted on the ceramic circuit board 60. The ceramic circuit board 60 is received in the cavity 31 and connects to the second end portion 33 of the barrel holder 30. Thus the image sensor 50 is received in the barrel holder 30 and is disposed at the second end portion 33 of the barrel holder 30. The optical lenses 21 such as the first lens 211, the second lens 212, the third lens 213 and the filter 214 in the lens barrel 10 optically communicate with the image sensor 50 in the barrel holder 30 to capture images. The image sensor 50 can be a charge coupled device (CCD) or a complementary metal oxide semiconductor (CMOS).

Referring to the drawing, an exemplary method for assembling the lens module 100 includes the following steps.

Step 1: a number of optical lenses 21 and a number of elastic spacers 22 are disposed in the lens barrel 10 in a manner that the optical lenses 21 and the elastic spacers 22 are arranged in an alternate fashion.

In detail, the first lens 211, the first elastic spacer 221, the second lens 212, the second elastic spacer 222, the third lens 213, the third elastic spacer 223 and the filter 214 are assembled into the lens barrel 10 in the order written from the second end 12 to the first end 11 of the lens barrel 10. Thus, the optical unit 20 including a number of optical lenses 21 and a number of elastic spacers 22 alternately arranged along the optical axis 15 is formed. Before assembling, an ultraviolet curing glue can be applied on the interfaces between the optical unit 20 and the lens barrel 10, for example, a surface of the first lens 211 contacting with the lens barrel 10, an interface of the filter 214 contacting the lens barrel 10, etc. An ultraviolet curing glue can also be applied on interfaces between two neighboring components of the optical unit 20, for example, an interface between the second lens 212 and the second spacer 222, an interface between the third elastic spacer 223 and the filter 214, etc. When the ultraviolet curing glue is cured by an ultraviolet radiation, the optical unit 20 can be installed in the lens barrel 10 firmly.

Step 2: the lens barrel 10 disposing the optical unit 20 therein is engaged with the barrel holder 30.

In the present embodiment, after the optical unit 20 is assembled into the lens barrel 10, the lens barrel 10 is screwed into the barrel holder 30. The first end portion 32 of the barrel holder 30 is coupled with the second end 12 of the lens barrel 10 by screw thread so that the barrel holder 30 engages with the lens barrel 10. A torque between the lens barrel 10 and the barrel holder 30 is in a range from 30 Newton·meter to 150 Newton·meter. Preferably, a torque between the lens barrel 10 and the barrel holder 30 is in a range from 50 Newton·meter to 130 Newton·meter.

After the lens barrel 10 is engaged with the barrel holder 30, the following assembling steps can be performed selectively according to a design of the lens module. For example, in the present embodiment, the glass cover 40, the ceramic circuit board 60 having the image sensor 50 mounted thereon are then assembled into the barrel holder 30 in the order written from the first end portion 32 to the second end portion 33 of the barrel holder 30, thereby obtaining the lens module 100.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens module, comprising:
   a lens barrel;
   a barrel holder engaged with the lens barrel;
   a plurality of optical lenses received in the lens barrel; and
   a plurality of elastic spacers received in the lens barrel;
   wherein the plurality of optical lenses comprises a first lens, a second lens, a third lens, and a filter, the plurality of elastic spacers comprises a first elastic spacer, a second elastic spacer, and a third elastic spacer, the first elastic spacer is disposed between the first lens and the second lens, the second elastic spacer is disposed between the second lens and the third lens, and the third elastic spacer is disposed between the third lens and the filter.

2. The lens module as claimed in claim 1, wherein the plurality of elastic spacers is comprised of a black elastic polymer material.

3. The lens module as claimed in claim 1, wherein each of the plurality of elastic spacers has a thickness in a range from 2 micrometers to 500 micrometers.

4. The lens module as claimed in claim 1, wherein each of the plurality of elastic spacers has a thickness in a range from 10 micrometers to 200 micrometers.

5. The lens module as claimed in claim 1, wherein the first lens comprises a first main portion and a first peripheral portion surrounding and extending from a periphery of the first main portion, thereby defining a space in the first lens, the second lens comprises a second main portion and a second peripheral portion surrounding and extending from a periphery of the second main portion, the second main portion engaged in the space, and the first elastic spacer is disposed in the space and between the first main portion and the second main portion.

6. The lens module as claimed in claim 1, wherein an outer diameter of the first elastic spacer is less than an outer diameter of each of the second elastic spacer and the third elastic spacer.

7. The lens module as claimed in claim 6, wherein an outer diameter of the second elastic spacer and that of the third elastic spacer each are equal to an inner diameter of the lens barrel.

8. A method for assembling a lens module, comprising:
   disposing a plurality of optical lenses and a plurality of elastic spacers in a lens barrel, wherein the plurality of optical lenses comprises a first lens, a second lens, a third lens, and a filter, the plurality of elastic spacers comprises a first elastic spacer, a second elastic spacer, and a third elastic spacer, the first elastic spacer is disposed between the first lens and the second lens, the second elastic spacer is disposed between the second lens and the third lens, and the third elastic spacer is disposed between the third lens and the filter; and
   engaging the lens barrel with a barrel holder.

9. The method as claimed in claim 8, wherein in the step of engaging the lens barrel with the barrel holder, the lens barrel is screwed into the barrel holder.

10. The method as claimed in claim 9, wherein a torque between the lens barrel and the barrel holder is in a range from 30 Newton·meter to 150 Newton·meter.

11. The method as claimed in claim 9, wherein a torque between the lens barrel and the barrel holder is in a range from 50 Newton·meter to 130 Newton·meter.

* * * * *